US011872835B2

(12) United States Patent
Khaliq

(10) Patent No.: US 11,872,835 B2
(45) Date of Patent: Jan. 16, 2024

(54) FOLDABLE CLIPBOARD

(71) Applicant: Muhammad Sarfraz Khaliq, Brea, CA (US)

(72) Inventor: Muhammad Sarfraz Khaliq, Brea, CA (US)

( * ) Notice: Subject to any disclaimer, the term of this patent is extended or adjusted under 35 U.S.C. 154(b) by 0 days.

(21) Appl. No.: 17/555,472

(22) Filed: Dec. 19, 2021

(65) Prior Publication Data

US 2023/0106163 A1 Apr. 6, 2023

Related U.S. Application Data

(60) Provisional application No. 63/245,804, filed on Sep. 18, 2021.

(51) Int. Cl.
*B42F 9/00* (2006.01)
*B42F 1/02* (2006.01)

(52) U.S. Cl.
CPC ................ *B42F 9/002* (2013.01); *B42F 1/02* (2013.01); *B42F 9/001* (2013.01); *B42P 2241/18* (2013.01); *B42P 2261/00* (2013.01)

(58) Field of Classification Search
CPC ................................. B42F 9/001; B42F 9/002
See application file for complete search history.

(56) References Cited

U.S. PATENT DOCUMENTS

| | | | |
|---|---|---|---|
| 4,997,088 A | 3/1991 | Spry | |
| 5,351,992 A | 10/1994 | Chilson et al. | |
| 5,590,910 A | 1/1997 | Meth | |
| 5,671,951 A | 9/1997 | Palmiter et al. | |
| D415,531 S | 10/1999 | Schultz | |
| 6,439,611 B1 | 8/2002 | Chen | |
| 7,225,570 B2 | 6/2007 | Windorski | |
| 8,246,080 B1 | 8/2012 | Bennett | |
| D723,799 S | 3/2015 | Glass et al. | |
| 9,296,553 B1 | 3/2016 | Glass | |
| 9,764,586 B2 | 9/2017 | Pankow et al. | |
| 2003/0034263 A1 | 2/2003 | D'Hoste | |
| 2007/0172309 A1 | 7/2007 | Witter et al. | |
| 2007/0187565 A1* | 8/2007 | Liptan | B42F 9/001 248/456 |
| 2012/0073998 A1 | 3/2012 | He | |
| 2017/0231347 A1 | 8/2017 | Ghanma | |
| 2021/0235830 A1 | 8/2021 | Fitzsimmons | |

FOREIGN PATENT DOCUMENTS

JP 3148952 U * 3/2009

OTHER PUBLICATIONS

JP3148952U English Translation (Year: 2009).*

* cited by examiner

*Primary Examiner* — Kyle R Grabowski
(74) *Attorney, Agent, or Firm* — Sue C. Watson; Southern Plains IP Law PLLC

(57) ABSTRACT

A foldable clipboard includes a three panel foldable clipboard in which three panels cooperate to form a single planar surface when in an extended position, and at least two panels of the three panels are configured to pivotally move to overlap at least one panel when in a folded position, such that the foldable clipboard is folded into a size to fit into a pocket of a garment.

10 Claims, 9 Drawing Sheets

FOLDABLE CLIPBOARD

TECHNICAL FIELD

The present invention relates to a foldable clipboard, and more particularly to a three panel foldable clipboard in which three panels are planar relative to each other in an extended position, and at least two panels of the three panels are configured to pivotally move to overlap one of the three panels a folded position.

BACKGROUND

Clipboards are utilized in a variety of different environments where a portable writing surface may be required. To this end, conventionally known basic clipboards generally consist of a flat panel or board and a clip mounted to one end of the board. The clip retains the writing materials or other documents being written upon against the writing surface provided by the board. Clipboards are an essential mobile writing platform that provides a flat surface for writing or drawing and which incorporates a clip device to secure a sheet of writing material. Clipboards of varying sizes and shapes are available commercially. Existing clipboards are cumbersome to carry due to their relatively large size and are inconvenient to use due to their large size. These clipboards have been restricted to merely carrying a few pages of writing material, and sometimes the pages become torn or damaged because such writing materials are unprotected on regular clipboards. These problems cause difficulty for people who, for example, but not by way of limitation, travel from one location to another, or are research scholars, physicians and healthcare workers, or who work outside, and the like.

While some of the foregoing are alleviated by computer-based electronics, such as cell phones, computer tablets, and lap top computers, it is not always easy even when utilizing one or more of these options. Typing on cell phones and tablets is not always easy when a person is in the field. While typing can be easier on a laptop computer, they are expensive and bulky to carry into the field. Further, sun light can make the screen of any of these products difficult to see. A low technology option does not carry these problems, except for size and the ability to write an a “regular” sheet of writing material, i.e., a standard 8.5 inch by 11 inch sheet for a sheet of writing material. The size of 8.5 inch by 11 inch for a sheet of writing material makes it more difficult to easily store on one’s person when in the field, such as, for example, but not by way of limitation, when checking electrical lines, sewer lines, livestock, land boundaries, and the like.

It would be desirable to have a low technology solution which permitted writing on a regularly-sized 8.5 inch by 11 inch sheet of writing material. Such a solution could hold at least several sheets of writing material, and such a solution would desirably be foldable to protect the writing material and prevent it from being crumpled, yet the solution would ideally fit within a pocket, a purse, and the like.

SUMMARY OF THE INVENTION

In a first embodiment of the present invention, a foldable clipboard comprises a first folding panel, a second panel, and a third folding panel, which cooperate collectively to form a single planar surface when in an expanded position. The foldable clipboard also includes a first pair of hinges and a second pair of hinges. Each hinge of the first pair of hinges and the second pair of hinges has an outer leg bracket and an inner leg bracket pivotally connected together. Each outer leg bracket of each of the first pair of hinges is connected to the first folding panel, and each inner leg bracket of each of the first pair of hinges is connected to the second panel. Each outer leg bracket of each of the second pair of hinges is connected to the third folding panel, and each inner leg bracket of each of the second pair of hinges is connected to the second panel. When the first folding panel, the second panel, and the third panel are in the expanded position, each outer leg bracket of each hinge of the first pair of hinges and the second pair of hinges is positioned at about 180 degrees with respect to each inner leg bracket connected thereto, to form collectively the single planar surface of the clipboard in the expanded position.

In an aspect of the first embodiment, each outer leg bracket of the second pair of hinges overlaps at least a portion of each respective inner leg bracket connected thereto when the third folding panel is moved into a folded position to overlap at least a portion of the second panel. Each outer leg bracket of the first pair of hinges overlaps at least a portion of each respective inner leg bracket connected thereto when the first folding panel is moved to overlap at least another portion of the second panel to form a folded position of the foldable clipboard.

In another aspect of the first embodiment, the foldable clipboard folds transversely relative to the alignment of the foldable clipboard when in the expanded planar position.

In yet another aspect of the first embodiment, 1, when in the folded position, the first folding panel is substantially parallel with the second panel, which is a position in a range of about 0 to 5 degrees relative to the second panel, and when in the folded position, the third folding panel is substantially parallel to the second panel.

And in an aspect of the first embodiment, each outer leg bracket of the first pair of hinges is positioned on a flange formed on each first and second side edge of the first folding panel, and each outer leg bracket of the second pair of hinges is positioned on a flange formed on each first and second side edge of the third folding panel, to permit the folding of the clipboard.

In still another aspect of the first embodiment, the clip of the folding clipboard is a spring-loaded clip and includes a mounting bracket connected to at least an upper surface of the first folding panel. The spring-loaded clip includes a handle that is frictionally positioned against the mounting bracket.

And in an aspect of the first embodiment, each outer leg bracket of the first pair of hinges is positioned on a flange formed on each first and second side edge of the first folding panel, and each outer leg bracket of the second pair of hinges is positioned on a flange formed on each first and second side edge of the third folding panel, to permit the folding of the clipboard.

In yet a further aspect of the first embodiment, in the expanded position, a lower edge of the first folding panel abuts an upper edge of the second panel, and a lower edge of the second panel abuts an upper edge of the third folding panel.

And in an aspect of the first embodiment, a pair of ends of the first folding panel are each rounded, and a pair of ends of the third folding panel are also each rounded.

In another aspect of the first embodiment, the first folding panel, the second panel, and the third folding panel are each constructed from at least one of metal, plastic, and cardboard.

In the first embodiment of the present invention, a method of making and using a foldable clipboard, the method comprising providing a first folding panel, a second panel, and a third folding panel. The method also comprises connecting together the first folding panel, the second panel, and the third folding panel via a first pair of hinges that are connected to both the first folding panel and the second panel, and a second pair of hinges that are connected to both the second panel and the third folding panel. Each hinge has an outer leg bracket and an inner leg bracket pivotally connected together. Each outer leg bracket of each of the first pair of hinges is connected to the first folding panel, and each inner leg bracket of each of the first pair of hinges is connected to the second panel. And each outer leg bracket of each of the second pair of hinges is connected to the third folding panel, and each inner leg bracket of each of the second pair of hinges is connected to the second panel. The method further includes pivotally moving the foldable clipboard from a folded position to an expanded position by rotating the first folding panel away from the second panel. Each outer leg bracket of the first pair of hinges are connected to the first folding panel and overlap at least a portion of each inner leg bracket on the second panel in the folded position. Moreover, the method includes rotating the third folding panel away from the second panel. Each outer leg bracket of the second pair of hinges is connected to the third folding panel and overlaps at least a portion of each inner leg bracket of the second panel in the folded position, and each outer leg bracket rotates relative to each inner leg bracket connected thereto to achieve about a 180 degree angle relative thereto. Each outer leg bracket rotates about 180 degrees relative to each inner leg bracket connected thereto when in the expanded position. The method also includes abutting and aligning a lower edge of the first folding panel to an upper edge of the second panel, and abutting and aligning a lower edge of the second portion to an upper edge of the third panel, forming a single planar surface and the expanded position for use of the foldable clipboard.

In an aspect of the method of the first embodiment, the method includes the step of moving the foldable clipboard from the expanded position to the folded position by rotating the third folding panel toward the second panel. Each outer leg bracket of the second pair of hinges on the third folding panel moves from the about 180 degree angle to a position to overlap at least a portion of the inner leg bracket connected thereto. An upper surface of the third folding panel moves simultaneously and overlaps a portion of an upper surface of the second panel, and the third panel is positioned substantially parallel to the second panel. The first folding panel is rotated toward from the second panel. Each outer leg bracket of the first pair of hinges on the first folding panel moving from the about 180 degree angle to a position to overlap the inner leg bracket connected thereto, the upper surface of the first folding panel moves simultaneously and overlaps another portion of the upper surface of the second panel and positioned substantially parallel thereto in the folded position.

In yet another aspect of the method of the first embodiment, in the step of moving the foldable clipboard from the expanded planar position to the folded position, the foldable clipboard folds transversely relative to the alignment of the foldable clipboard when in the expanded planar position.

In still another aspect of the method of the first embodiment, in the step of moving the foldable clipboard from the expanded position to the folded position, the first folding panel is substantially parallel with the second panel, and substantially parallel is a position in a range of 0 to 5 degrees relative to the second panel, and the third folding panel is substantially parallel to the second panel.

In another aspect of the method of the first embodiment, each outer leg bracket of the first pair of hinges is positioned on a flange formed on each first and second side edge of the first folding panel, and each outer leg bracket of the second pair of hinges is positioned on a flange formed on each first and second side edge of the third folding panel, to permit folding of the clipboard.

In yet another aspect of the method of the first embodiment, the method further includes positioning a spring-loaded clip that includes a mounting bracket on the upper surface of the first folding panel. The spring-loaded clip includes a handle that is frictionally positioned against the mounting bracket of the first folding panel.

Also, in another aspect of the method of the first embodiment, in the step of providing a first folding panel, a second panel, and a third folding panel, a pair of ends of the first folding panel are each rounded, and a pair of ends of the third folding panel are each rounded.

Moreover, in a further aspect of the method of the first embodiment, in the step of providing a first folding panel, a second panel, and a third folding panel, the first folding panel, the second panel, and the third folding panel comprise at least one of metal, plastic, and cardboard.

BRIEF DESCRIPTION OF THE DRAWINGS

The structure, operation, and advantages of the present invention will become further apparent upon consideration of the following description taken in conjunction with the accompanying figures. The figures are intended to be illustrative, and not limiting.

DETAILED DESCRIPTION OF THE PREFERRED EMBODIMENTS

Figure 1:
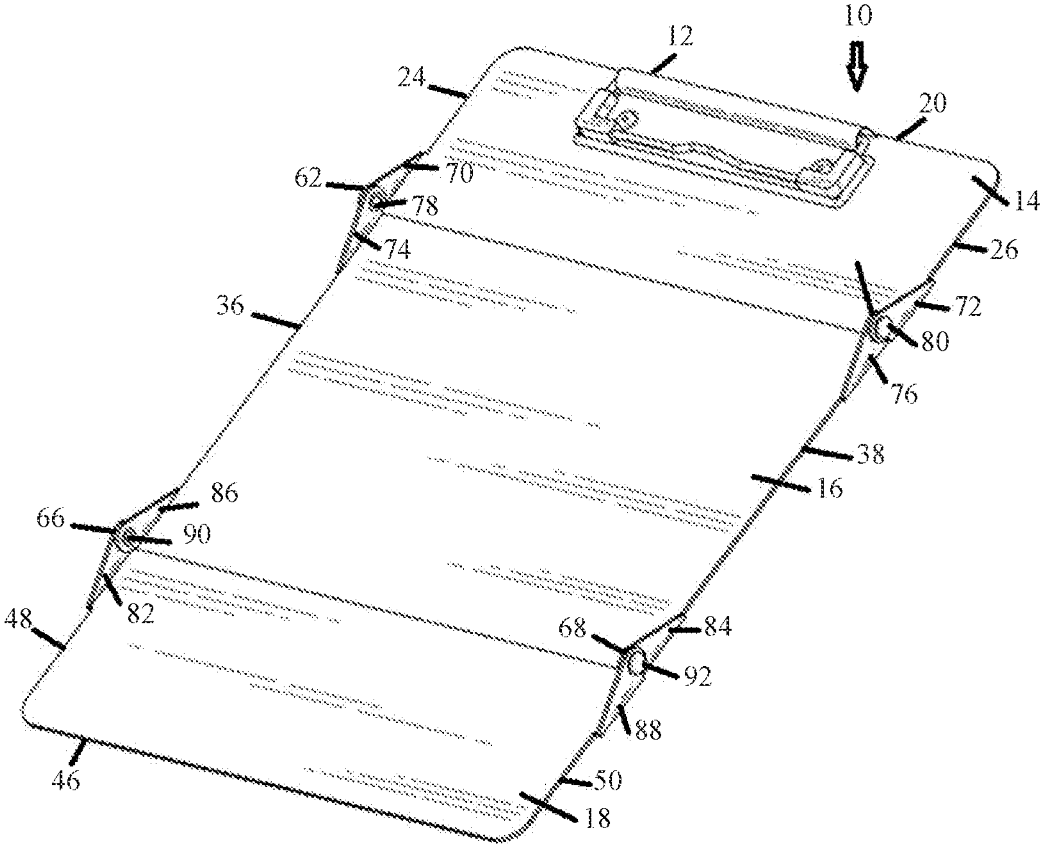
FIG. 1 is an upper surface perspective view of the foldable clipboard in an open position, according to the present invention.

In the description that follows, numerous details are outlined to provide a thorough understanding of the present invention. It will be appreciated by those skilled in the art that variations of these specific details are possible while still achieving the results of the present invention.

Exemplary illustrative embodiments of the invention should be interpreted as example(s) and non-limiting. The relationship between various components, where they are located, their composition(s), their operation, and sometimes their sizes relative to the desired operation of the invention are significant.

The foldable clipboard 10 is designed as an improvement to a traditional flat, rigid clipboard and other known clipboards. It is designated as a "mini" foldable clipboard 10 because it can be folded to a size which is reasonable to place, for example, but not by way of limitation, in a suit jacket pocket, a laboratory coat pocket, a standard coat pocket, a pants pocket, a purse, and the like. The foldable clipboard 10 is of particular use to doctors and medical personnel because the foldable clipboard 10 can be folded in two (2) layers to comfortably fit into a medical coat pocket, a scrubs pocket, and even a jeans pocket. For example, the foldable clipboard 10 may be utilized to secure patient assessment forms, nursing protocols, medication lists, and all documentation in a HIPAA compliant secure foldable clipboard. However, it is within the terms of the embodiment that the foldable clipboard 10 may also be used to accommodate the needs of a variety of different people in a variety of services or work environments, as described in non-limiting examples herein.

Referring now to FIGS. 1, 2, 4-8, the foldable clipboard 10 includes a clip 12, as well as a first folding panel 14, a second panel 16, and a third folding panel 18. The first folding panel 14, the second folding panel 16, and the third folding panel 18 are planar. Further, each panel 14, 16, 18 are also, for example, but not by way of limitation, substantially rectangular. "Substantially rectangular" as used herein, means that at least eighty (80) percent of the shape is rectangular, but the shape may include minor variations, such as flanges, and the like.

The first folding panel 14 includes the clip 12, and the first folding panel 14 is defined by an upper edge 20 and a spaced-apart lower edge 22, a first side edge 24 spaced-apart from a second side edge 26, an upper surface 28 and a lower surface 30.

The second panel includes an upper edge 32 and a spaced-apart lower edge 34, and a first side edge 36 spaced-apart from a second a side edge 38. The second panel includes an upper surface 40, and a lower surface 42.

The third folding panel 18 also includes an upper edge 44, a spaced-apart lower edge 46, a first side edge 48 and a second side edge 50. The third folding panel also includes an upper surface 52 and a lower surface 54.

The third folding panel 18 and the first folding panel 14 each folds over and each overlaps the second panel 16, therefore, the second panel is twice as large as each individual first folding panel 14 and third folding panel 18 to accommodate when each first and third folding panels 14, 18 fold over to cover the upper surface 40 of the second panel. The upper edge 20 of the first folding panel 14 and the lower edge 46 of the third folding panel 18 are positioned adjacent to each other, next to each other, or may touch each other. While the second panel 16 is larger than the first folding panel 14 and the third folding panel 18, the first folding panel 14 and the third folding panel 18 are desirably substantially similar in size and shape.

The clip 12 is positioned desirably and for example, but not by way of limitation, on the upper surface 28 of the first panel 14 near the upper edge 26 thereof, and includes a mechanism, i.e., a clip, to hold writing material (not shown) to the foldable clipboard 10. While one type of clip 12 is illustrated and described in detail herein, it will be appreciated that any low profile clip which holds writing material to the foldable clipboard 10 may be used. For example, as illustrated best in FIGS. 1, 2, and 4, the present clip 12 may include a bracket 56 and a pair of connectors 58 which connect the bracket 56 to the foldable clipboard 10. The bracket 56 desirably includes a spring-loaded clip in the form of a handle 60 which is urged toward the foldable clipboard 10. When the handle 60 is raised, writing material may be positioned on the foldable clipboard 10 and when the handle 60 is released, the handle 60 is urged toward the foldable clipboard 10 to hold the writing material in a desired position.

The clip 12 and any part(s) thereof may be formed from metal and/or plastic. The clip 12 illustrated herein is commercially available. The clip may be connected to the foldable clipboard via welding, adhesives, connectors (as shown herein) or by any other manner known in the art. More than one clip may be used, and the present clip 12 and/or additional clips may be connected to any surface of the clipboard 10. In addition, paper or other material having releasable adhesive may be connected to the clipboard 10. In this instance, the clipboard may not include the clip 12.

A pair of first and second upper hinges 62, 64 and a pair of first and second lower hinges 66, 68 connect the first folding panel 14, the second panel 16, and the third folding panel 18 together. First and second upper hinges 62, 64, include outer leg brackets 70, 72, and inner leg brackets 74, 76, respectively.

In the first upper hinge 62, the outer leg bracket 70 is pivotally connected to the inner leg bracket 74 via a pin 78. The outer leg bracket 70 is also connected to the first side edge 24 of the first folding panel 14 near the lower edge 22 thereof. The inner leg bracket 74 is connected to the first side edge 36 of the second panel 16 near the upper edge 32 thereof.

Similarly, in the second upper hinge 64, the outer leg bracket 72 is connected to the inner leg bracket 76 via a pin 80. The outer leg bracket 72 is also connected to the second side edge 26 of the first folding panel 14 near the lower edge 22 thereof. The inner leg bracket 76 is connected to the second side edge 38 of the second panel 16 near the upper edge 32 thereof.

First and second lower hinges 66, 68, include outer leg brackets 82, 84, and inner leg brackets 86, 88, respectively. In the first lower hinge 66, the outer leg bracket 82 is pivotally connected to the inner leg bracket 86 by pin 90. The outer leg bracket 82 is also connected to the first side edge 36 of the second panel 16 near the lower edge 34 thereof. The inner leg bracket 86 is connected to the first side edge 48 of the third folding panel 16 near the upper edge 44 thereof.

And in the second lower hinge 68, the outer leg bracket 84 is pivotally connected to the inner leg bracket 88 by pin 92. The outer leg bracket 84 is also connected to the second side edge 38 of the second panel 16 near the lower edge 34 thereof. The inner leg bracket 88 is connected to the second side edge 50 of the third folding panel 18 near the upper edge 44 thereof.

Each hinge 62, 64, 66, 68 is a type of knife hinge and may be formed, for example, but not by way of limitation, from metal or plastic. The hinges 62, 64, 66, 68 may be integrally formed with each of the panels 14, 16, 18 as shown and described herein, and the pivot pin 79, 80, 90 92 added to each later. Alternatively, each hinge 62, 64, 66, 68, may be connected to panels 14, 16, 18 as shown and described in detail herein by welding, adhering, connecting via connectors, and all other forms of connection known in the art. Knife hinges are available commercially. Varying a position of hinges 62, 64, 66, 68 on a surface of a panel rather than an edge of a panel 14, 16, 18 is also enabled herein, as is a variation of size or type of any hinge 62, 64, 66, 68 herein.

Figure 2:
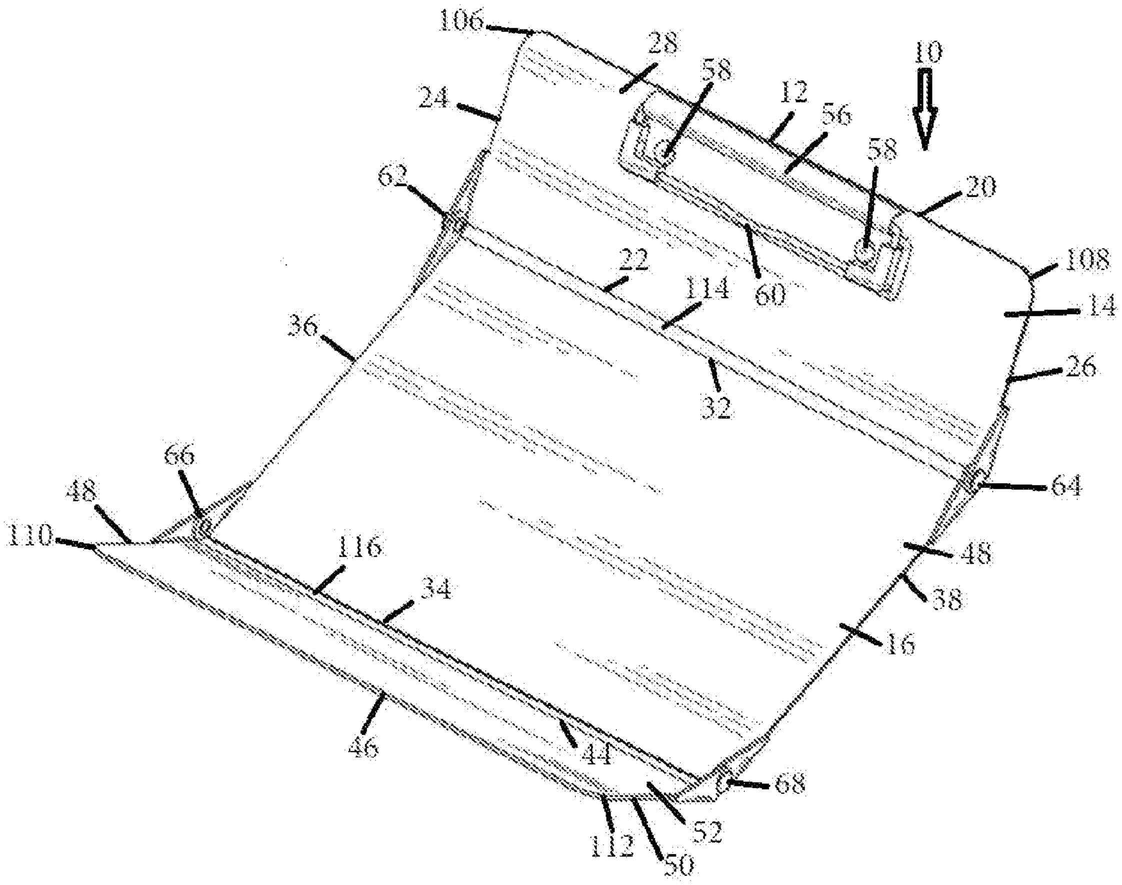
FIG. 2 is a perspective view of a partially folded position of the foldable clipboard of FIG. 1.
Figure 3:
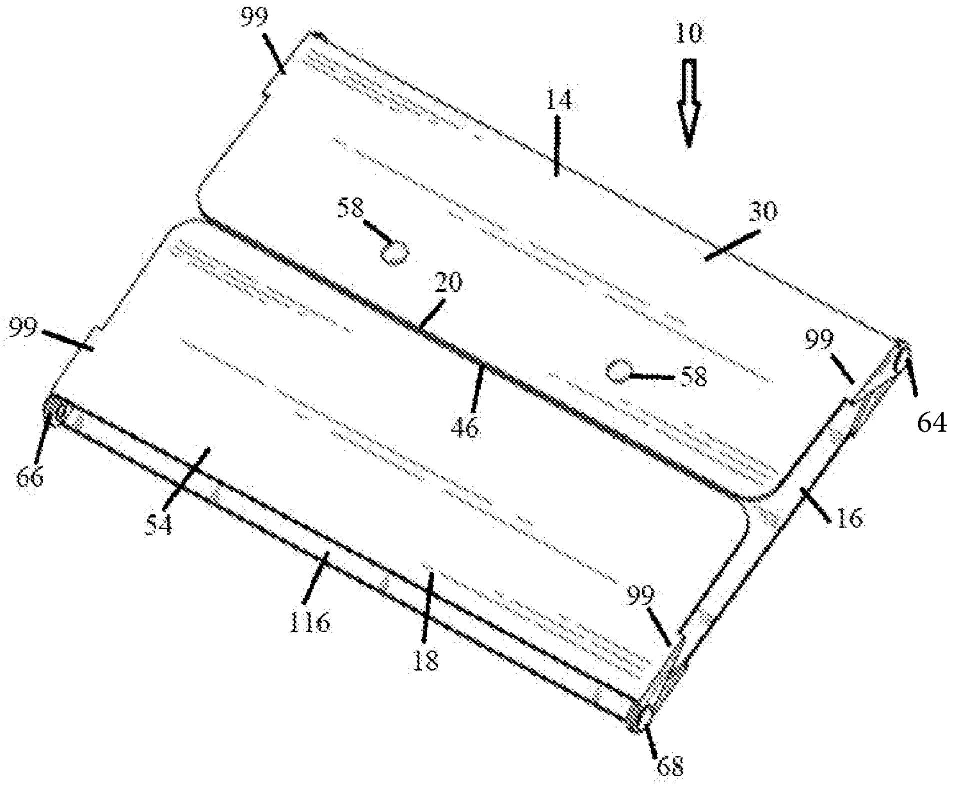
FIG. 3 is a perspective view of a completely folded position of the foldable clipboard of FIGS. 1 and 2.
Figure 4:
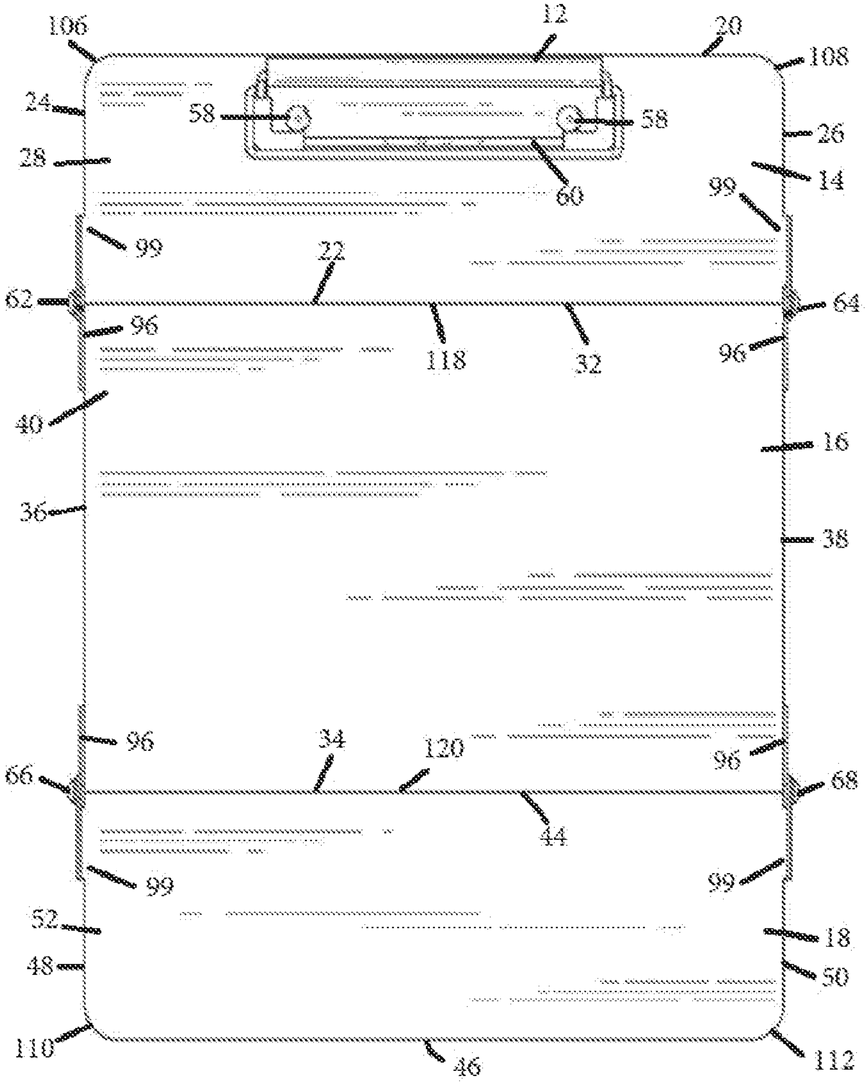
FIG. 4 is a top plan view of an upper surface of the foldable clipboard of FIG. 1.
Figure 5:
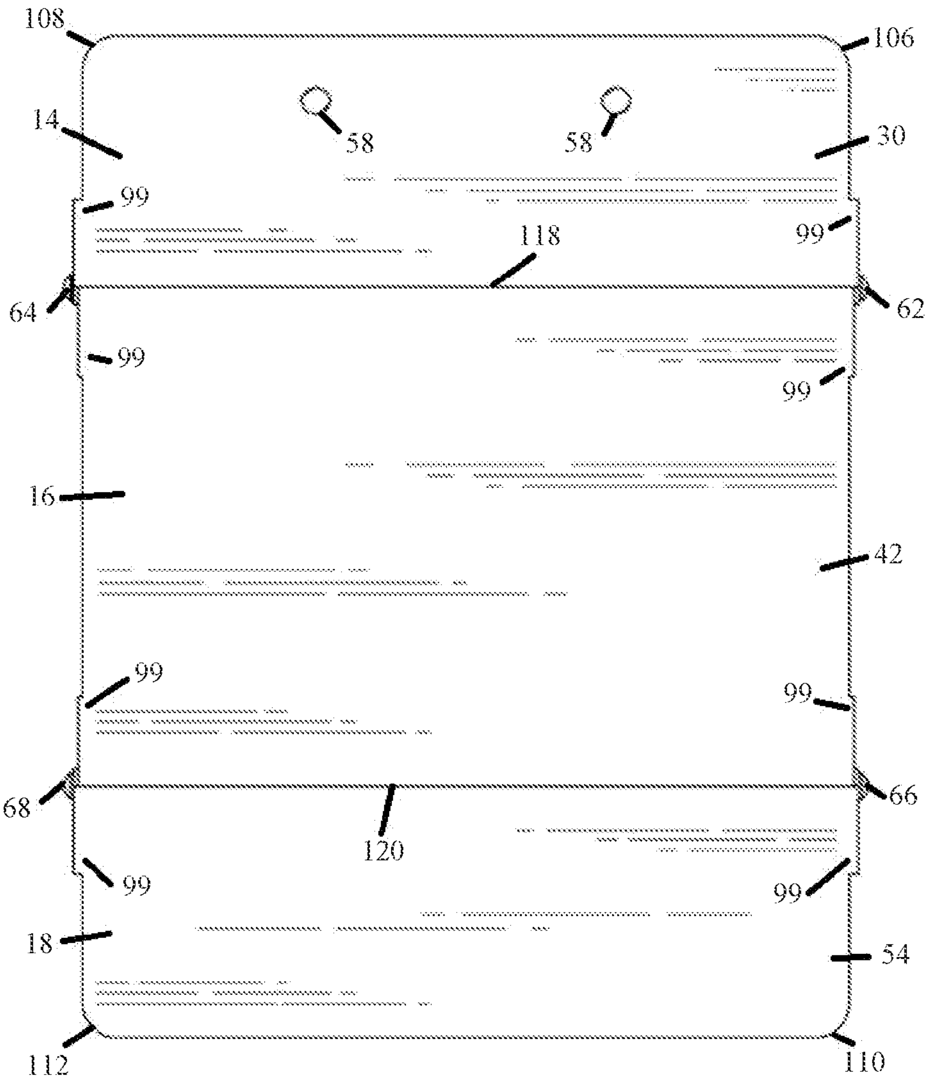
FIG. 5 is a bottom plan view of a lower surface of the foldable clipboard of FIG. 1.
Figure 6:
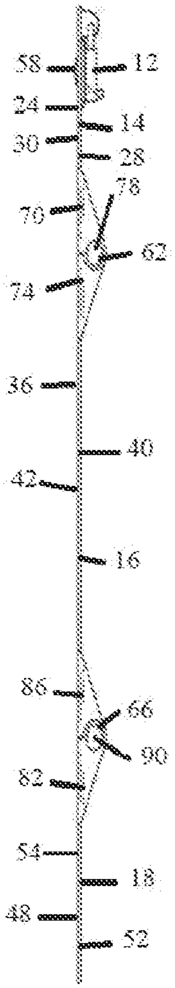
FIG. 6 is a side view of one side of the foldable clipboard of FIG. 1.
Figure 7:
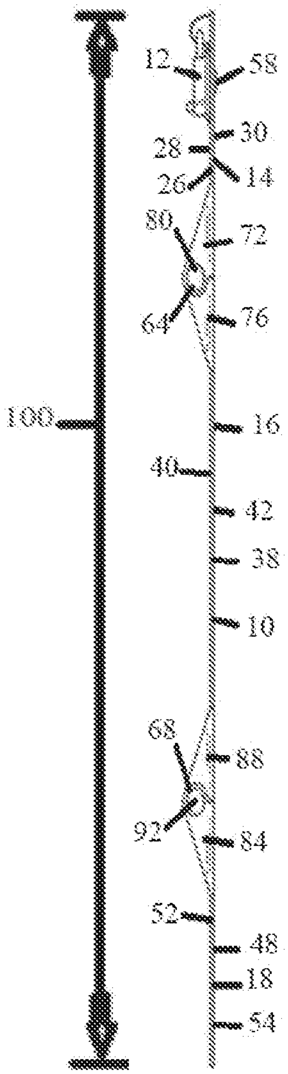
FIG. 7 is an opposite side view of the foldable clipboard of FIG. 1, relative to the side view of FIG. 6.
Figure 8:
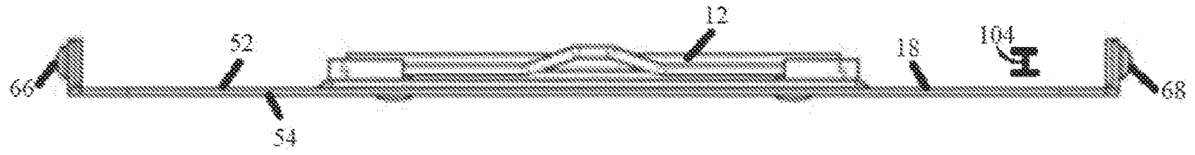
FIG. 8 is a bottom plan view of a lower edge of the foldable clipboard of FIG. 1.
Figure 9:
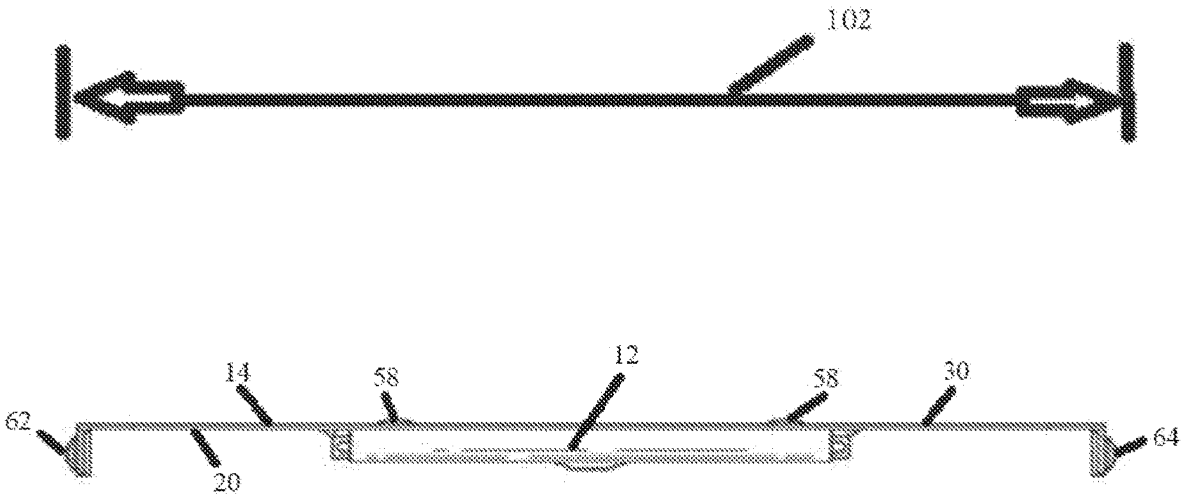
FIG. 9 is a top plan view of an upper edge of the foldable clipboard of FIG. 1.

Referring to FIGS. 1, 2, and 3, each hinge 62, 64, 66, and 68, respectively, are formed to permit each outer leg bracket thereof 70, 72, 82, 84, respectively, to overlap each inner leg bracket 74,76, 86, 88, respectively. Each location and each connection of each hinge 62, 64, 66, and 68 are configured to enhance the ability of the foldable clipboard 10 to fold as shown and described herein.

Each inner leg bracket 74, 76, 86, 88, respectively, and each outer leg bracket 70, 72, 82, 84, respectively, of each hinge 62, 64, 66, 68, respectively, is connected to the foldable clipboard along an inner surface 96 of each outer leg bracket 70, 72, 82, 84, respectively, and each inner leg bracket 74, 76, 86, 88, respectively, of each respective hinge 62, 64, 66, 68. Each outer leg brackets 70, 72, 82, 84 of hinges 62, 64, 66, 68, respectively, may include, or be positioned upon a small flange 99 formed on each side edge of the first folding panel 14 and the third folding panel 18 to permit the connection of the outer leg brackets 70, 72, 82, 84 to their respective panels, namely, the first folding panel 14 (outer leg brackets 70, 72) and the third folding panel 18 (outer leg brackets 82, 84), so that each outer leg bracket 70, 72, 82, 84 can overlap its respective inner leg bracket 74, 76, 86, 88.

Referring to FIGS. 1, 2, and 3, and in a method of use, the position of outer leg brackets and inner leg brackets relative to the first folding panel 14 and the third folding panel 18 permit the first folding panel 14 and the third folding panel 18 to fold over the second panel 16, in a closed position, but not to overlap each other. That is, the outer leg brackets 82, 84, respectively, of the first and second lower hinges 66, 68, respectively, pivotably move to overlap the inner leg brackets 86, 88, respectively, of the first and second lower hinges 66, 68, respectively, to permit the third folding panel 18 to fold and overlap the second panel 16. And the outer leg brackets 70, 72, respectively, of the first and second upper hinges 62, 64, respectively, pivot to overlap the inner leg brackets 74, 76, respectively, of the first and second upper hinges 62, 64, respectively, to permit the first folding panel 14 to fold and overlap the second panel 16, as illustrated in FIGS. 1 and 3.

Referring to FIGS. 1 and 4-8, it will be understood that the panels 14, 16, and 18 of the foldable clipboard cooperate to form a single flat, planar surface which is rigid and suitable for securing documents and providing a writing surface to hold writing material (not shown) thereupon. In this configuration, a person can easily hold and write on the planar surface thereon. This planar position is deemed the planar expanded position. When in the planar extended position, it will be appreciated that the lower edge 22 of first folding panel 14 abuts the upper edge 32 of the second panel 16. And the upper edge 44 of the third folding panel 18 abuts the lower edge 34 of the second panel 16, to form the planar expanded position.

When the foldable clipboard 10 is moved into the folded position, the foldable clipboard 10 naturally hides any writing materials it is holding, thus helping maintain confidentiality when it is desired, while also protecting the writing material from damage. And, when in the folded position, the foldable clipboard 10 is sized to be positioned in a pocket, a purse, and the like.

The foldable clipboard 10 may be constructed of any suitable rigid material, such as cardboard, metal, plastic, and combinations thereof. In particular, but not by way of limitations, aluminum provides a very strong, lightweight material that is very durable. Alternatively, plastic also provides a strong and lightweight material that is relatively inexpensive to manufacture. The foldable clipboard 10 may have any desired dimensions which will hold a standard writing material, such as, for example but not by way of limitation, an 8.5 inch by 11 inch piece of paper, when the foldable clipboard is in the expanded position. However, it must be noted that the foldable clipboard 10 should be sized appropriately to accommodate an 8.5 inch by 11 inch writing material (or other smaller-sized writing material. For example, but not by way of limitation, the foldable clipboard 10 may have a length 100 of 12 inches and a width 102 of 9 inches. The depth 104 or thickness of the foldable clipboard 10 may range from 0.5 millimeter to 5 millimeters. It will be understood that other lengths, depths, and widths of the foldable clipboard 10 are possible, so long as the foldable clipboard 10 operates as shown and described in detail herein, and includes the advantages shown and described herein.

Each panel 14, 16, 18 of the foldable clipboard 10, desirably is generally rectangular, and may be configured to be substantially rectangular in shape. In the present embodiment, as noted previously, the first folding panel 14 and the third folding panel 18 are desirably substantially similarly or identical in size and shape, while the second panel 16 will have about twice the length and width of the first and second folding panels 14, 18. Alternatively, one or more panels may include alternative dimensions. For example, first folding panel 14 and third folding panel 18 includes small flanges 99 on each side edge 24, 26, 48, 50, respectively, thereof. The first folding panel 14 may have rounded outer corners 106, 108, and the third folding panel may also have rounded corners 110, 112. Each rounded corner 106, 108, 110, 112 may have, for example, but not by way of limitation, a slope that is about a 30 degree slope. The rounded edges are advantageous in allowing the foldable clipboard 10 to smoothly store in a pocket or other enclosure.

When the foldable clipboard 10 is moved into the folded position, as illustrated in FIGS. 2 and 3, a first space 114 is formed between the third folding panel 18 and the second panel 16, and a second space 116 is formed between the second panel 16 and the first folding panel 14. The first and second spaces 114, 116, respectively, and the hinges 64, 64, 66, 68, permit the spacing of both the overlapped third folding panel 18 and the overlapped first folding panel 14, such that the first folding panel 14 and the third folding panel 18 may have about a 0 degrees angle relative to the second panel 16 when in the folded position and therefore each first folding panel 14 and third folding panel 18 is substantially parallel thereto. However, it will be understood that this desired about 0 degree angle may vary somewhat when a large amount of writing material is held on the foldable clipboard 10. Therefore, as used herein, "about a 0 degree" angle or "substantially a 0 degree" angle, or "substantially parallel" or "about parallel", means within a range of between 0 degrees and 5 degrees of an angle or alignment, such as a "parallel" alignment.

When the foldable clip board 10 is in the planar expanded position, the first folding panel 14, the second folding panel 16, and the third folding panel 18 cooperate together with the hinges 62, 64, 66, 68 to form a first stop 118 which is formed between the lower edge 22 of the first folding panel 14 and the upper edge 32 of the second panel which abut each other in the expanded position, to assist in holding the first folding panel 14 and the second holding panel 16 in the planar expanded position. Similarly, a second stop 120 is formed between the lower edge 34 of the second panel 16 and the upper edge 44 of the third folding panel 18 which abut each other in the expanded position, to assist in holding the second panel 16 and the third folding panel 18 in the planar expanded position.

While the clip 12 is positioned on an upper surface 28 of the first folding panel 14, it will be understood that the clip 12 is excluded from the consideration of the planar expanded position, and the clip 12 is desirably a low profile clip as illustrated, or could be formed partially or totally within the first panel 14 to more closely conform to the planar formation of the foldable clipboard 10 (not shown)

Although the invention has been shown and described concerning a certain preferred embodiment or embodiments, certain equivalent alterations and modifications will occur to others skilled in the art upon the reading and understanding of this specification and the annexed drawings. In particular regard to the various functions performed by the above-described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed concerning only one of several embodiments, such feature may be combined with one or more features of the other embodiments as may be desired and advantageous for any given or particular application.

What is claimed is:

1. A foldable clipboard, comprising:

a first folding panel, a second panel, and a third folding panel configured to form a single planar surface when positioned in an expanded position, such that a second edge of the first folding panel abuts a first edge of the second panel and a second edge of the second panel abuts a first edge of the third folding panel;

a first pair of hinges, each hinge of the first pair of hinges positioned spaced-apart in a transverse alignment relative to each other, each hinge of the first pair of hinges including an outer leg bracket and an inner leg bracket that are pivotally connected together, wherein one respective outer leg bracket of one hinge of the first pair of hinges connects to and extends from a flange extending away from a first side edge of the first folding panel and the other respective outer leg bracket of the other hinge of the first pair of hinges connects to and extends from a flange extending away from a second side edge of the first folding panel, and one respective inner leg bracket of the one hinge of the first pair of hinges connects to a first side edge of the second panel, and the other respective inner leg bracket of the other hinge of the first pair of hinges connects to a second side edge of the second panel; and a second pair of hinges, each hinge of the second pair of hinges positioned spaced-apart in a transverse alignment relative to each other, each hinge of the second pair of hinges including an outer leg bracket and an inner leg bracket that are pivotally connected together, wherein one respective outer leg bracket of one hinge of the second pair of hinges connects to and extends from a flange extending away from a first side edge of the third folding panel and the other respective outer leg bracket of the other hinge of the second pair of hinges connects to and extends from a flange extending away from a second side edge of the third folding panel, and one respective inner leg bracket of the one hinge of the second pair of hinges connects to the first side edge of the second panel, and the other respective inner leg bracket of the other hinge of the second pair of hinges connects to the second side edge of the second panel, wherein each outer leg bracket and each inner leg bracket of the first pair of hinges and the second pair of hinges includes an inner side facing each other, and an outer side positioned opposite to each respective inner side, and wherein when the foldable clipboard is moved into a folded position, the inner side of each outer bracket of both the first pair of hinges and the second pair of hinges moves over at least a portion of each outer side of each inner leg bracket of both the first pair of hinges and the second pair of hinges.

2. The foldable clipboard of claim 1, wherein the foldable clipboard folds transversely relative to an alignment of the foldable clipboard when in the expanded position.

3. The foldable clipboard of claim 1, wherein when in the folded position, the first folding panel overlaps and is substantially parallel with the second panel, and wherein when in the folded position, the third folding panel overlaps and is substantially parallel to the second panel, and both the first folding panel and the third folding panel are in a position in a range of about 0 to 5 degrees relative to the second panel.

4. The foldable clipboard of claim 1, wherein each outer leg bracket of the first pair of hinges is positioned on a flange formed on one of the first and second side edges of the first folding panel or the first and second side edges of the second panel, and each outer leg bracket of the second pair of hinges is positioned on a flange formed on one of the first and second side edges of the third folding panel or the first and second side edges of the second panel.

5. The foldable clipboard of claim 1, including a clip.

6. The foldable clipboard of claim 5, wherein the clip is a spring-loaded clip.

7. The foldable clipboard of claim 6, wherein the clip includes a mounting bracket connected to a surface of the foldable clipboard.

8. The foldable clipboard of claim 1, wherein in the expanded position, a lower edge of the folding panel abuts an upper edge of the second panel, and wherein a lower edge of the second panel abuts an upper edge of the third folding panel.

9. The foldable clipboard of claim 1, wherein a pair of ends of the first folding panel are each rounded, and wherein a pair of ends of the third folding panel are each rounded.

10. The foldable clipboard of claim 1, wherein the first folding panel, the second panel, and the third folding panel are each constructed from at least one of metal, plastic, and cardboard.

* * * * *